(12) United States Patent
Monden et al.

(10) Patent No.: US 10,621,505 B2
(45) Date of Patent: Apr. 14, 2020

(54) CLOUD COMPUTING SCORING SYSTEMS AND METHODS

(71) Applicant: HYPERGRID, INC., Mountain View, CA (US)

(72) Inventors: Jason Peter Monden, Trophy Club, TX (US); Daniel David Karmazyn, Boca Raton, FL (US); Perron Richard Sutton, North Richland Hills, TX (US); Yi Zhou, Denton, TX (US)

(73) Assignee: HYPERGRID, INC., Mountain View, CA (US)

( * ) Notice: Subject to any disclaimer, the term of this patent is extended or adjusted under 35 U.S.C. 154(b) by 1119 days.

(21) Appl. No.: 14/687,748

(22) Filed: Apr. 15, 2015

(65) Prior Publication Data

US 2015/0302304 A1 Oct. 22, 2015

Related U.S. Application Data

(60) Provisional application No. 61/980,928, filed on Apr. 17, 2014.

(51) Int. Cl.
| | |
|---|---|
| *G06N 20/00* | (2019.01) |
| *G06F 17/24* | (2006.01) |
| *G06F 17/27* | (2006.01) |

(52) U.S. Cl.
CPC .......... *G06N 20/00* (2019.01); *G06F 17/241* (2013.01); *G06F 17/2785* (2013.01)

(58) Field of Classification Search
CPC .. G06N 99/005; G06N 20/00; G06F 17/2785; G06F 17/241
See application file for complete search history.

(56) References Cited

U.S. PATENT DOCUMENTS

| | | |
|---|---|---|
| 7,987,262 B2 | 7/2011 | Tung et al. |
| 8,032,846 B1 | 10/2011 | Balasubramanian et al. |

(Continued)

FOREIGN PATENT DOCUMENTS

| | | |
|---|---|---|
| WO | 2013/112184 A1 | 8/2013 |

OTHER PUBLICATIONS

Aspect-Oriented Sentiment Analysis of Customer Reviews Using Distant Supervision Techniques—2013 vorgelegt von.*

(Continued)

*Primary Examiner* — Kakali Chaki
*Assistant Examiner* — Ababacar Seck
(74) *Attorney, Agent, or Firm* — Workman Nydegger

(57) ABSTRACT

There is disclosed a computer-implemented cloud computing scoring system. In an embodiment, a parser receives unstructured sentiment data commenting on a scored service. The parser identifies in the unstructured sentiment data a service category of the scored service. The parser selects from the unstructured sentiment data text relating to the service category and matching one or more opinionative words and phrases listed in a keyword dictionary, thereby producing a structured comment associated with the service category. The structured comment is classified as positive or negative according to a list of exemplary sentiment data sets contained in a learning seed file. The exemplary sentiment data sets are manually assigned a positive or a negative polarity. The learning seed file is configured for enhancement by the ongoing addition of structured sentiment data, the structured sentiment data commenting on the scored service and having a polarity classification.

20 Claims, 19 Drawing Sheets

(56) References Cited

U.S. PATENT DOCUMENTS

| | | | |
|---|---|---|---|
| 8,504,443 | B2 | 8/2013 | Ferris et al. |
| 8,532,798 | B2* | 9/2013 | Ferraro, III ............ G06Q 90/00 700/91 |
| 2007/0011183 | A1* | 1/2007 | Langseth .......... G06F 17/30616 |
| 2008/0133488 | A1* | 6/2008 | Bandaru ............. G06F 17/2785 |
| 2008/0249764 | A1* | 10/2008 | Huang ................ G06F 17/2785 704/9 |
| 2008/0270116 | A1* | 10/2008 | Godbole ............... G06F 17/279 704/9 |
| 2009/0125371 | A1* | 5/2009 | Neylon ............. G06F 17/30616 707/739 |
| 2010/0119053 | A1* | 5/2010 | Goeldi ................... G06Q 10/00 379/265.09 |
| 2011/0078167 | A1* | 3/2011 | Sundaresan ......... G06F 17/2785 707/765 |
| 2011/0213712 | A1 | 9/2011 | Hadar et al. |
| 2011/0270968 | A1 | 11/2011 | Salsburg et al. |
| 2012/0060212 | A1 | 3/2012 | Inoue |
| 2012/0131591 | A1 | 5/2012 | Moorthi et al. |
| 2012/0185544 | A1* | 7/2012 | Chang .................... G06Q 50/01 709/206 |
| 2012/0233212 | A1* | 9/2012 | Newton ................. G06Q 30/02 707/774 |
| 2012/0239739 | A1 | 9/2012 | Manglik et al. |
| 2012/0296977 | A1 | 11/2012 | Ellison et al. |
| 2012/0316916 | A1* | 12/2012 | Andrews ................ G06Q 40/08 705/7.28 |
| 2013/0013644 | A1* | 1/2013 | Sathish ............. G06F 17/30867 707/792 |
| 2013/0060837 | A1 | 3/2013 | Chakraborty et al. |
| 2013/0067090 | A1 | 3/2013 | Batrouni et al. |
| 2013/0117157 | A1 | 5/2013 | Iyoob et al. |
| 2013/0268674 | A1 | 10/2013 | Bailey et al. |
| 2013/0332588 | A1 | 12/2013 | Maytal et al. |
| 2013/0346161 | A1 | 12/2013 | Mayerle |
| 2013/0346227 | A1 | 12/2013 | Jain et al. |
| 2014/0006369 | A1* | 1/2014 | Blanchflower ... G06F 17/30985 707/706 |
| 2014/0068053 | A1 | 3/2014 | Ravi et al. |
| 2014/0074647 | A1 | 3/2014 | Mukherjee et al. |
| 2015/0269234 | A1* | 9/2015 | Castellanos ........... G06F 16/254 707/602 |
| 2015/0286627 | A1* | 10/2015 | Chang ................. G06F 17/2705 704/9 |

OTHER PUBLICATIONS

Opinion mining and sentiment analysis—2008 Bo Pang and Lillian Lee.*

Sentiment Analysis on Twitter—2012.*

Garg, et al., "SMICloud: A Framework for Comparing and Ranking Cloud Services", 2011 Fourth IEEE International Conference on Utility and Cloud Computing, pp. 210-218.

Garg, et al., "A Framework for Ranking of Cloud Computing Services", Future Generation Computer Systems, 2013, vol. 29, pp. 1012-1023.

Li, Jim (Zhanwen), et al., "Performance Model Driven QoS Guarantees and Optimization in Clouds", ICSE:09 Workshop, May 23, 2009, pp. 15-22.

Pauluk, Przemyslaw, et al., "Introducing STRATOS: a Cloud Broker Service", pp. 1-8.

Tordsson, Johan, et al., "Cloud Brokering Mechanisms for Optimized Placement of Virtual Machines Across Multiple Providers", Future Generation Computer Systems, 2012, vol. 28, pp. 358-367.

* cited by examiner

Ratings Detail

Data Application
Displaying Normalized Scores

| Service Provider | Infrastructure | Security | Reliability | Service Level | Customer Service | Usability | Price | Performance | Technology | Overall ˅ |
|---|---|---|---|---|---|---|---|---|---|---|
| AWS | 924 | 963 | 984 | 1000 | 924 | 947 | 832 | 865 | 775 | 942 |
| Softlayer | 924 | 966 | 886 | 954 | 944 | 912 | 714 | 865 | 770 | 896 |
| Google | 924 | 842 | 930 | 422 | 962 | 818 | 749 | 865 | 740 | 787 |
| Bob | 924 | 856 | 798 | 834 | 790 | 249 | 994 | 865 | 710 | 754 |
| Ethel | 924 | 958 | 912 | 790 | 114 | 795 | 499 | 865 | 660 | 678 |

[Return]

FIGURE 13

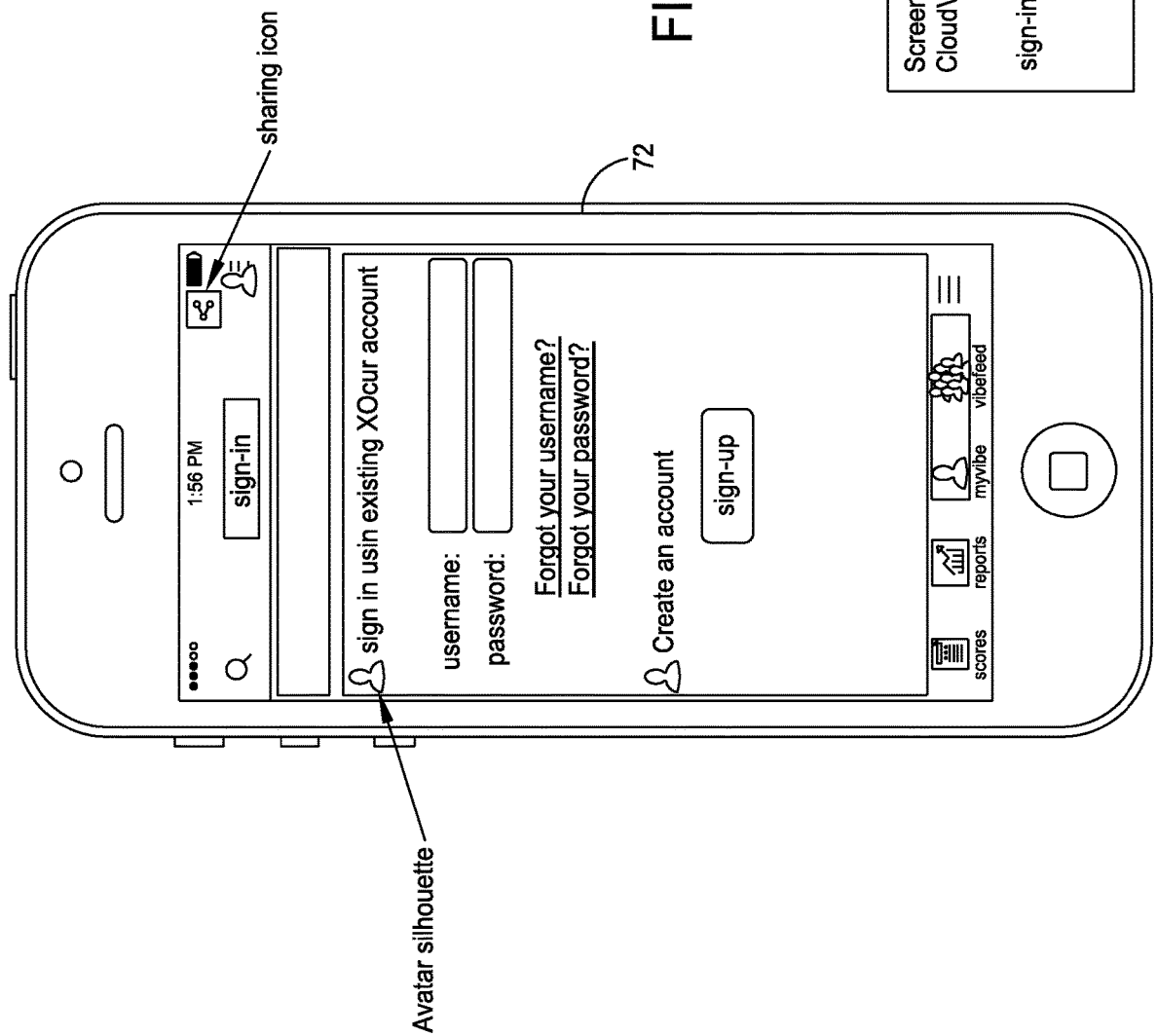
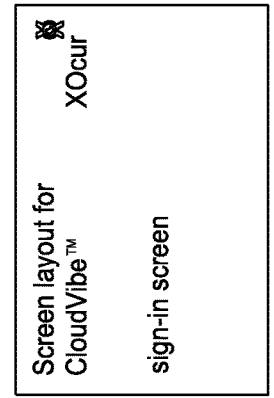
FIGURE 14
Data Acquisition Mobile App
Screen layout for CloudVibe™ XOcur sign-in screen Data Acquisition Mobile App Data Acquisition Mobile App Data Acquisition Mobile App

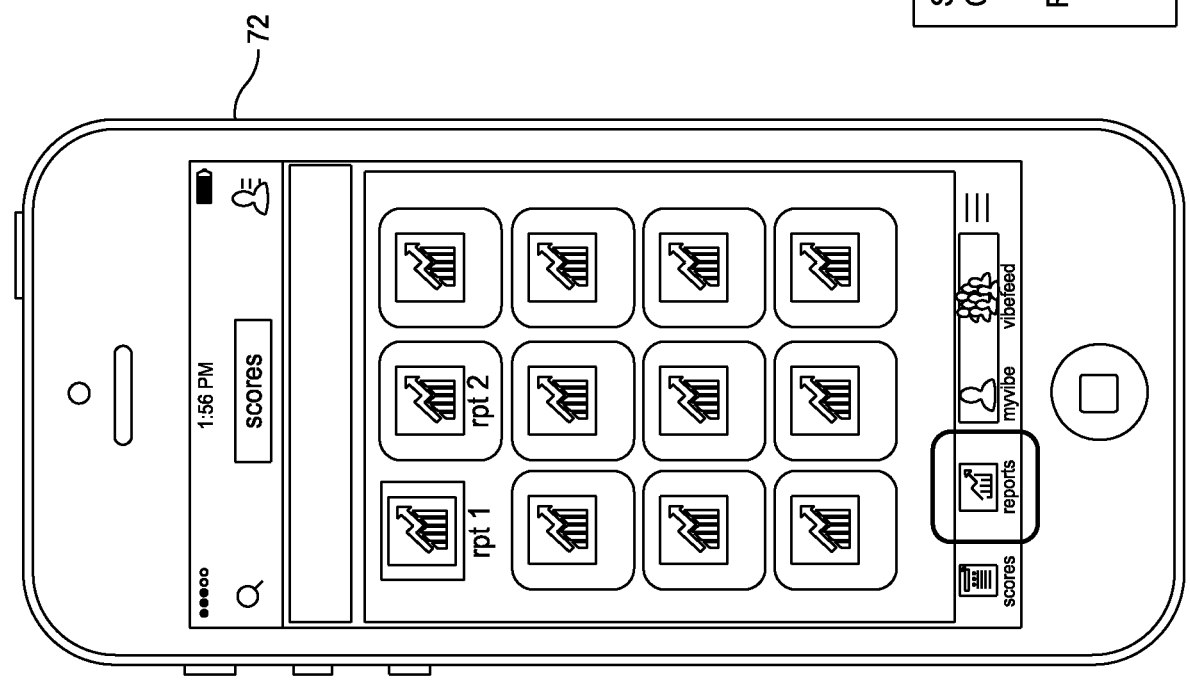

CLOUD COMPUTING SCORING SYSTEMS AND METHODS

CROSS-REFERENCE TO RELATED APPLICATIONS

The present application claims priority to U.S. Provisional Application No. 61/980,928 filed on Apr. 17, 2014 and entitled CLOUD COMPUTING SCORING SYSTEMS AND METHODS, the entire contents of Application 61/980,928 being expressly incorporated by reference herein.

BACKGROUND

As businesses and enterprises migrate to the Cloud for accessing IT resources, they require reliable, contextual data for choosing a service provider that will best suit their particular constellation of needs. Evaluating cloud providers may be difficult because the service measurement indices (SMIs) used to evaluate performance may vary widely from one service provider to the next. One method of comparing cloud service providers is to gather individual reports through word of mouth, blogs, and social networking. However, individual reports are highly unstructured, lack context, and do not address all of SMIs.

Another method of choosing a cloud service provider may be to process and integrate social sentiment data from a variety of social networking sources such as Twitter®. However, sentiment analysis may have substantial inaccuracies, especially if generic and not tailored to a specific domain like cloud computing. Additionally, generic opinion mining may lack a structured detail on specific service categories. Alternately, benchmarking services may be able to periodically measure the fine details of the many technical components of a cloud platform, reporting the performance to a consumer. Unfortunately, benchmarking is expensive, and the results lack an aggregate user's perspective for "how all the pieces fit together" to make a good cloud computing experience.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a computer-implemented cloud computing scoring system which may comprise a parser receiving unstructured sentiment data commenting on a scored service. The parser may identify in the unstructured sentiment data a service category of the scored service. The parser may select from the unstructured sentiment data text relating to the service category and matching one or more opinionative words and phrases listed in a keyword dictionary, thereby producing a structured comment associated with the service category. The structured comment may be classified as positive or negative according to a list of exemplary sentiment data sets contained in a learning seed file. The exemplary sentiment data sets may be manually assigned a positive or a negative polarity. The learning seed file may be configured to be enhanced by the ongoing addition of structured sentiment data, the structured sentiment data commenting on the scored service and having a polarity classification.

In another embodiment, there is disclosed a computer-implemented cloud computing scoring system which may comprise a data acquisition component gathering data reporting on a scored service in a service category. The data may be gathered from at least two of unstructured sentiment data, structured sentiment data, and structured analytics data. A data analysis component may perform sentiment analysis on the sentiment data which generates a classified sentiment result from the unstructured sentiment data and a structured sentiment result from the structured sentiment data. The data analysis component may manually score the structured analytics data to generate a structured analytics result. A data processing component may weight the structured analytics result, the classified sentiment result, and the structured sentiment result according to a relative influence of each. The weighted results may be combined and normalized into a normalized score on a standard scale. A data application component may display the normalized score for the scored service within the service category.

In yet another embodiment, there is disclosed a computer-implemented cloud computing scoring method which may comprise parsing unstructured sentiment data commenting on a scored service, thereby identifying a service category of the scored service. The method may further include selecting from the unstructured sentiment data text that matches one or more opinionative words and phrases listed in a keyword dictionary, thereby producing structured comment associated with the service category. The method may further include classifying, using a learning seed file, the structured comment as positive or negative according to a list of exemplary sentiment data sets contained in the learning seed file, the exemplary sentiment data sets being manually assigned a positive or a negative polarity, said classifying thereby generating a classified sentiment result. The method may further include configuring the learning seed file to be enhanced by the ongoing addition of structured sentiment data, the structured sentiment data commenting on the scored service and having a polarity classification.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIG. 13 illustrates a data application displaying normalized scores for a cloud computing scoring systems and methods, in accordance with an embodiment of the present disclosure.

FIG. 14 illustrates a mobile application for data acquisition and display for a cloud computing scoring systems and methods, in accordance with an embodiment of the present disclosure.

FIG. 19 illustrates a mobile application for data acquisition and display for a cloud computing scoring systems and methods, in accordance with an embodiment of the present disclosure.

DETAILED DESCRIPTION

Figure 1:
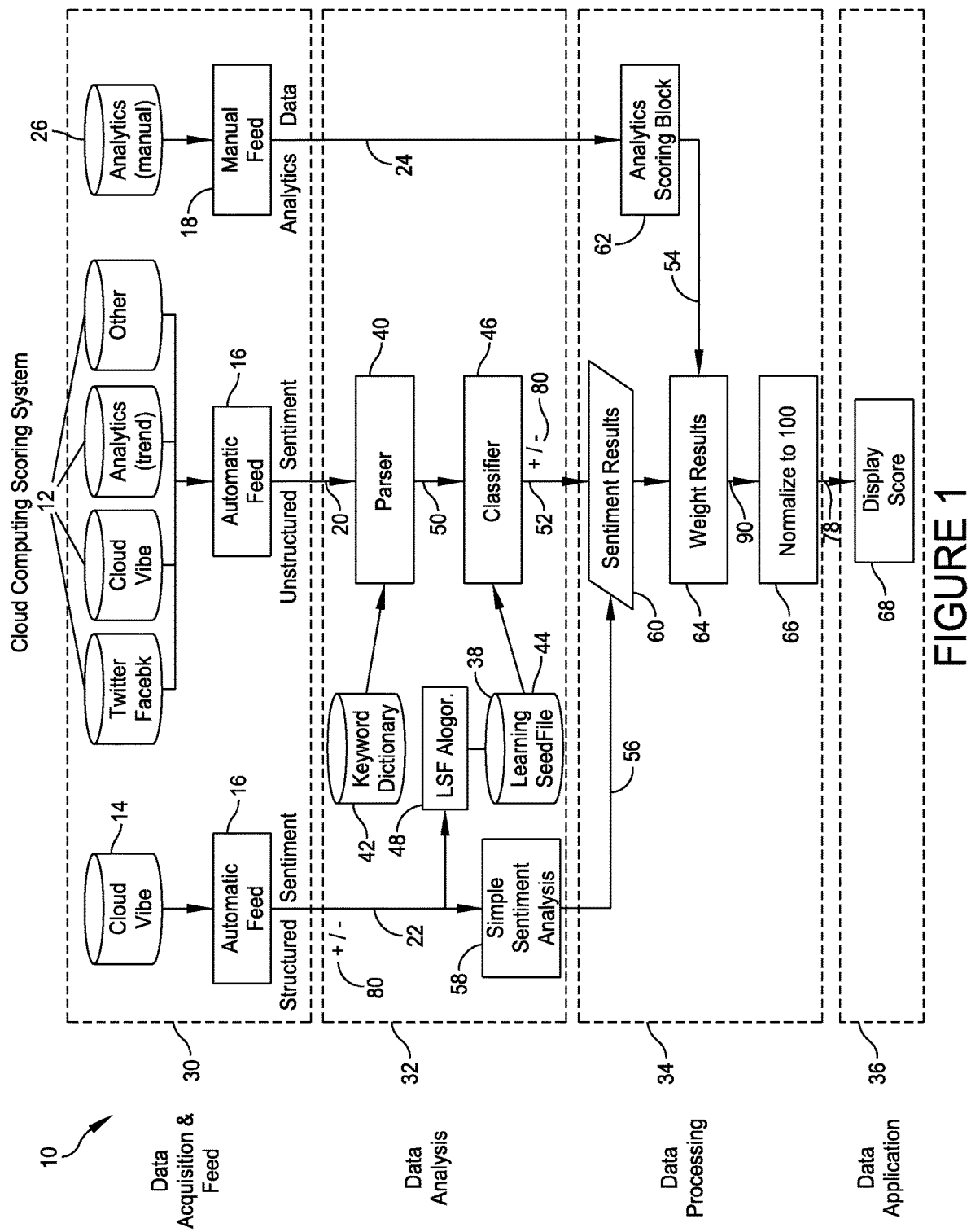
FIG. 1 illustrates a system block diagram for a cloud computing scoring systems and methods, in accordance with an embodiment of the present disclosure.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 3:
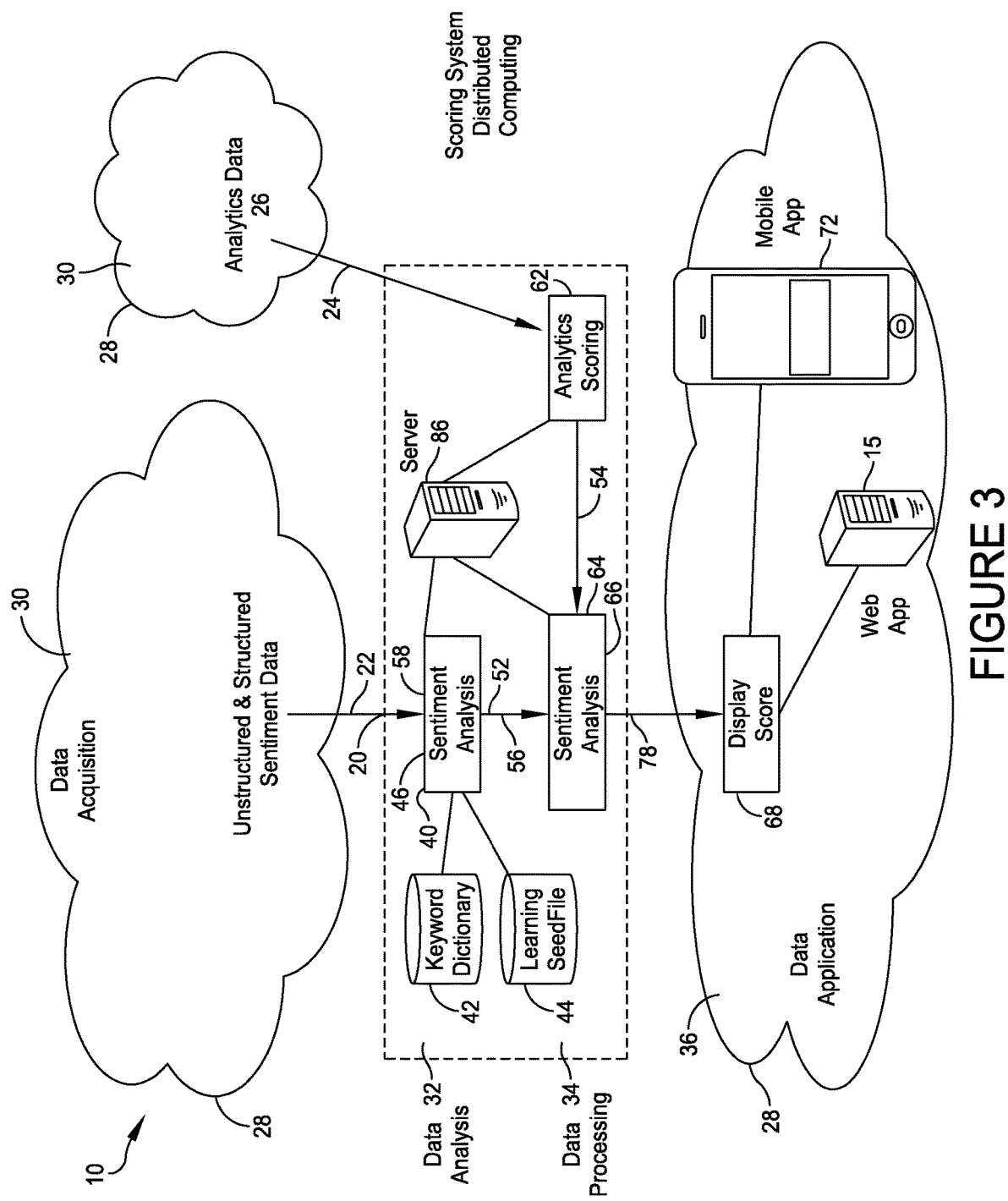
FIG. 3 illustrates a distributed computing architecture for a cloud computing scoring systems and methods, in accordance with an embodiment of the present disclosure.

In an embodiment, referring to FIGS. 1 and 3, a cloud computing scoring system ("scoring system") 10 may comprise a data acquisition and feed component 30 feeding data automatically 16 into a data analysis component 32 for performing sentiment analysis on the collected commentary regarding various cloud computing service providers (not shown) to be scored. Data acquisition block 30 may also manually 18 deliver structured analytics data 24, such as benchmarking measurements or performance reports, for further processing. Data processing block 34 may receive sentiment results 60 and analytics data 24 for weighting, combining, and normalizing, which may then produce a normalized score 78 rating the quality of each service category of one or more cloud computing service providers (FIG. 13). Displayed score 68 in data application component 36 may be displayed to web application 15 and/or mobile application 72.

Continuing with FIGS. 1 and 3, in various embodiments, the compute, memory, storage, and software resources of scoring system 10 may be distributed according to best performance, price, and resource availability known to those skilled in the art. In an embodiment, referring to FIG. 3, server 86 may coordinate the operation of resources within data analysis 32 and data processing 34 components, while analytics database 26 may be connected to processing 32 from another location within internet cloud 28. Unstructured sentiment data 20 and structured sentiment data 22 may be connected from different locations within internet cloud 28. Normalized score 78 may be delivered to web application 15 and mobile application 72 in various locations via internet cloud 28. Alternately, portions of data analysis 32 and data processing 34 may be executed by separate servers or remotely. For example, keyword dictionary 42 may exist in the cloud and may be accessed by parser 40 for performing sentiment analysis.

Now referring to FIG. 1, in an embodiment, unstructured sentiment data 20 may be fed automatically 16 from a variety of data sources 12 in order to mine opinion data for reporting on the performance of various service categories of a cloud service provider. Service categories (FIG. 13) for which scoring is desired may include infrastructure, security, reliability, service level, customer service, usability, price, performance, technology, and an overall rating for the service provider. Unstructured sentiment data 20 may be widely available, copious, and may comprise text commentary, yet may generally lack an identified service category or service provider structured to the sentiment data. Data sources 12 may include Twitter®, Facebook®, unstructured data from a crowd-sourcing application called CloudVibe™, unstructured analytics trending data from a service provider assessment platform, and other data sources 12 such as social networking feeds, internet articles, news, and blogs. Because cloud platforms may be rapidly changing due to competitive and technology churn, the availability of unstructured sentiment data 20 may present an opportunity to update and improve service provider scoring without the cost of elaborate marketing surveys or benchmarking measurement programs. Unfortunately, unstructured sentiment data 20 may not have been structured according to service provider or service category, nor classified as to a positive or negative polarity classification indicating attitude or observation.

Continuing with FIG. 1, in an embodiment, a crowd-sourcing application database 14 may store structured sentiment data from a mobile application 72 such as CloudVibe™ (FIGS. 14-19). Mobile application 72 may allow registered users to score a service provider by entering a "thumbs up" or thumbs down" polarity classification 80 associated with a service category and a service provider, including entering a brief text comment. The CloudVibe™ mobile application 72 may display scoring for various service providers to the registered users and may thereby present one useful perspective for choosing a service provider. The disclosure that follows describes how CloudVibe™ or other structured sentiment data may be utilized to update and improve service provider scoring beyond what a dedicated crowd-sourcing application or structured analytics may do alone.

Figure 2:
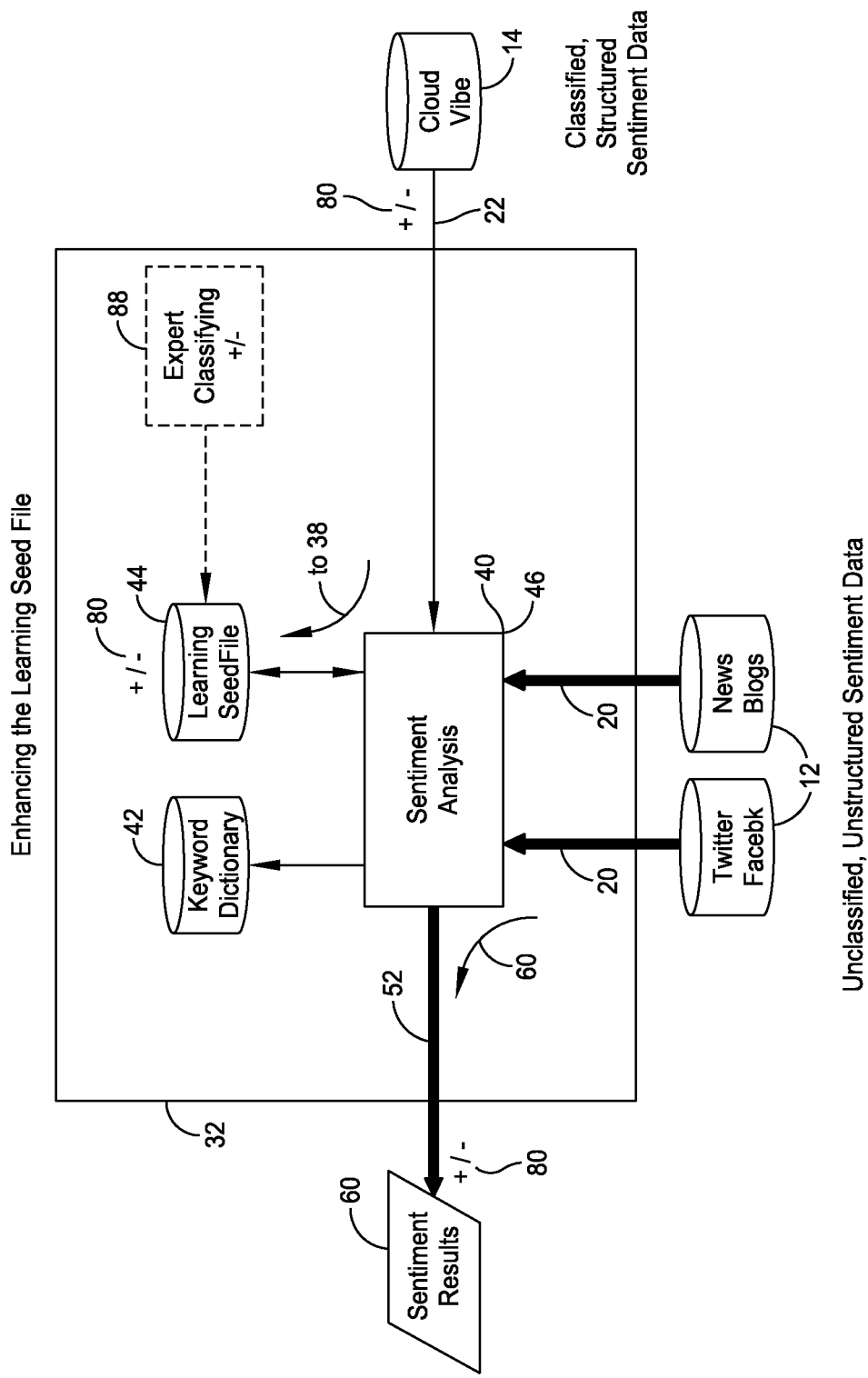
FIG. 2 illustrates a block diagram for a learning seed file of a cloud computing scoring systems and methods, in accordance with an embodiment of the present disclosure.

Referring to FIGS. 1 and 2, in an embodiment, parser 40 may receive unstructured sentiment data 20 commenting on a service provider (a scored service) to be scored and may identify a service category (not shown). Parser 40 may also identify a scored service. For example, a list of service categories and scored services may be stored in parser 40 or in the associated keyword dictionary 42, and which may be matched to words in the unstructured sentiment data for identification thereof. Parser 40 may select from the unstructured sentiment data 20 text relating to the service category and matching one or more opinionative words and phrases listed in keyword dictionary 42, thereby producing structured comment 50 associated with the service category. Keyword dictionary 42 may be a generic sentiment database with a thorough list of words and phrases indicative of unambiguous opinion, or may be domain-specific, such as for engineering or computers, and may include terms and jargon common in the field of cloud computing in order to identify the service category and affect.

Continuing with FIGS. 1 and 2, in various embodiments, structured comment 50 may then be classified by classifier 46 as positive or negative according to a list of exemplary sentiment data sets 38 contained in learning seed file 44, and may thereby generate classified sentiment result 52. The exemplary sentiment data sets 38 may be manually assigned a positive or a negative polarity 80 by an industry expert 88. This manual assignment may be a kind of training process performed when scoring system 10 is installed, or may be periodically performed. Additionally, in an embodiment, a third classification may be a neutral classification in the case of a weak or ambiguous opinion. Alternatively, data sets 38 may be assigned a positive or negative strength on a scale, such as from −10 to +10. The learning seed file may provide lists of commentary specific to each service category and associated with an industry-trained polarity, whereas the keyword dictionary may identify and structure the target categories to an opinionative subset of the commentary in the sentiment data. Alternately, the classifying function 46 may be contained in the learning seed file 44 storing exemplary data sets 38.

Continuing further with FIGS. 1 and 2, in an embodiment, learning seed file 44 may be configured to be enhanced by the ongoing addition of structured sentiment data 22 commenting on the scored service and having a polarity classification 80. By the use of structured data 22, the learning seed file 44 may learn additional words, phrases, and/or word constellations which may appear in unstructured sentiment data 20 and whose addition to exemplary sentiment data sets 38 updates and improves the accuracy of service provider scoring. In an embodiment, learning seed file 44, through its algorithm 48, may identify opinionative words and phrases within structured sentiment data 22 that enhance exemplary sentiment data sets 38, and may add the sentiment data to the learning seed file 44. Alternatively, crowd-sourcing database 14 may provide sentiment data structured in a form ready to be added directly to exemplary sentiment data sets 38 should the addition improve the quality of the scoring. For example, a structured sentiment may strongly indicate an opinion for a service category largely missing from exemplary sentiment data sets 38, and learning seed file 44 may determine that adding the strong sentiment data will therefore enhance the scoring system's ability to benefit from the receipt of unstructured data 20.

Advantageously, the use of pre-classified, structured sentiment data 22 to update an industry-tuned 88 exemplary sentiment data sets 38 may act as a continuous self-training, making better contextual use of social networking data and thereby provide aggregate scoring from the user's perspective. In summary, the steps of parsing, classifying, and enhancing the sentiment analysis of unstructured social networking data 20 may provide an advantage over existing methods of parsing and classifying against a list of words after training the sentiment analysis algorithm prior to initial deployment.

Continuing further with FIG. 1, in an embodiment, simple sentiment analysis block 58 may associate a service category with a polarity classification 80 of structured sentiment data 22 for delivering a structured sentiment result 56 to data processing component 34. Sentiment results pool 60 may collect structured sentiment result 56 and classified sentiment result 52 for weighting, combining, and normalizing. Alternately, the format of structured sentiment data 22 may not require formatting by simple sentiment analysis block 58 if data 22 is ready for combining. In an embodiment, classified sentiment result 52 may be processed 34 without being combined with structured sentiment data 22, score 78 having already benefited by the ongoing addition of structured sentiment data 22 to learning seed file 44. Advantageously, simple sentiment analysis block 58 may be simple because data 22 has already been parsed and classified with a polarity 80.

Figure 4:
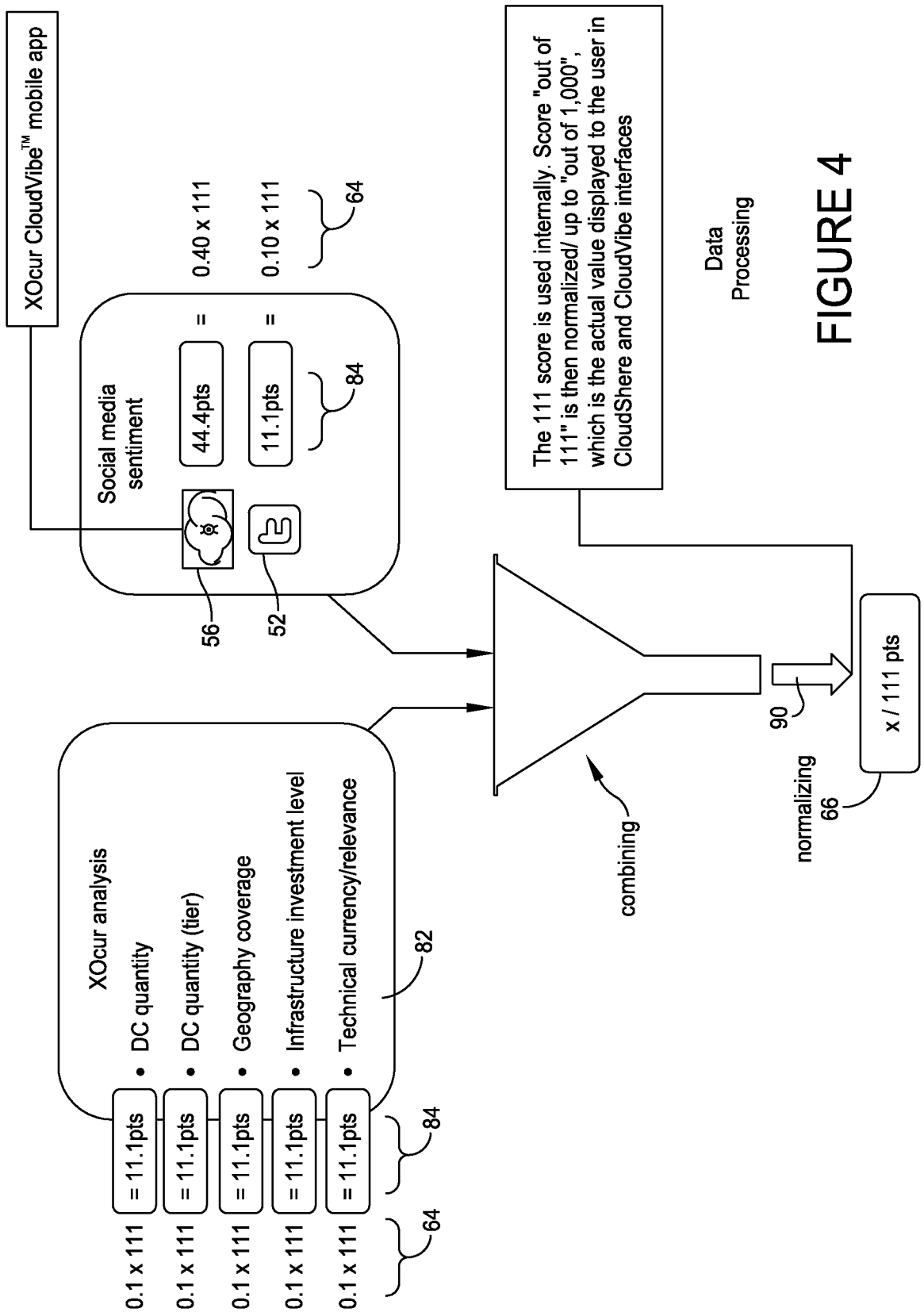
FIG. 4 illustrates a data processing calculation for a cloud computing scoring systems and methods, in accordance with an embodiment of the present disclosure.
Figure 5:
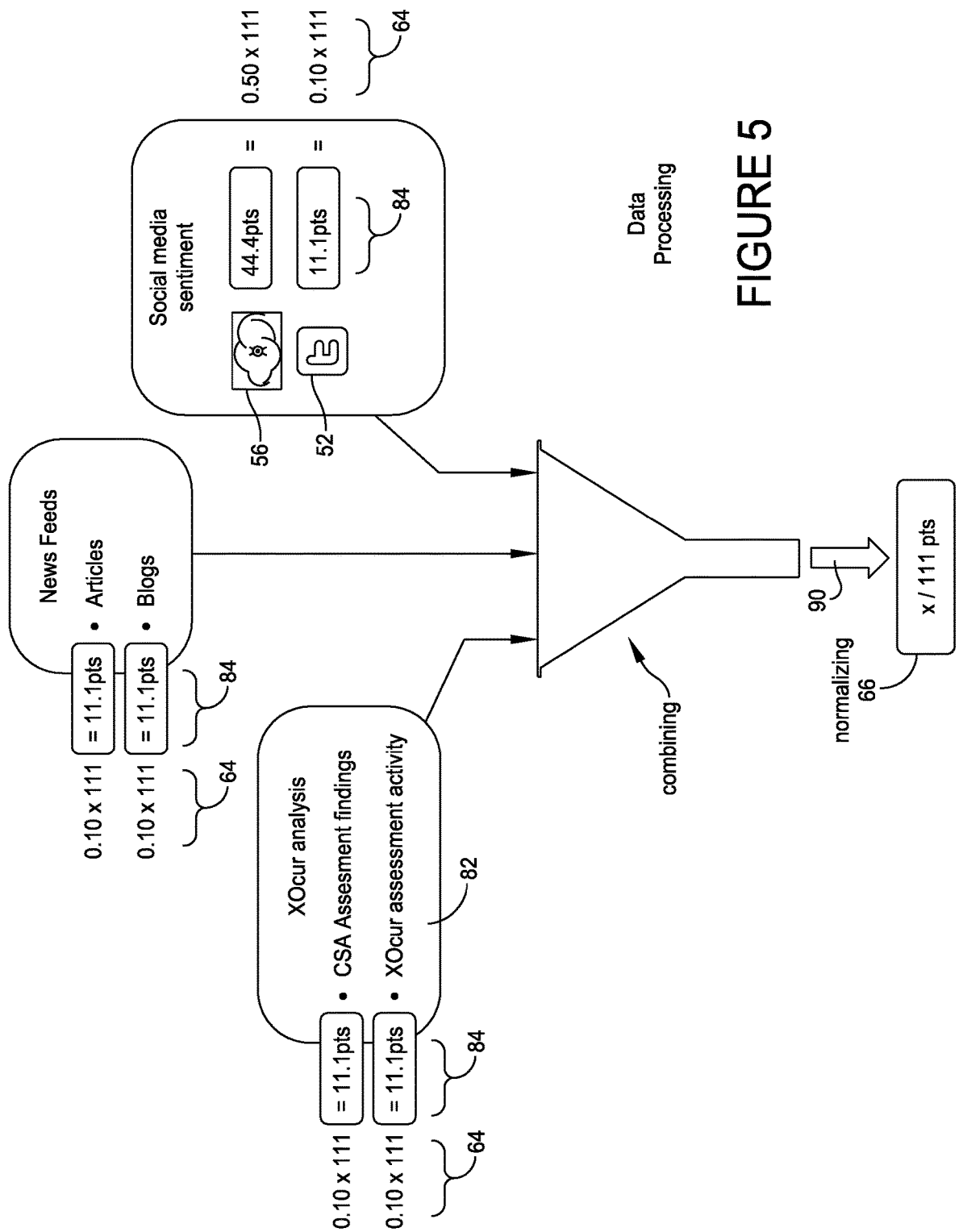
FIG. 5 illustrates a data processing calculation for a cloud computing scoring systems and methods, in accordance with an embodiment of the present disclosure.

Referring still to FIG. 1, in an embodiment, weighting block 64 may weight results 56 and 52 according to a relative influence of each. The relative weighting may depend on the reliability of each result to generate an accurate score for normalized score 78. In an embodiment, analytics data 24 quantifying the scored service may be processed by analytics scoring block 62 to generate a structured analytics result 54 compatible in format with the format of sentiment results 56 and 52. For example, analytics data 24 may quantify several analytics performance factors 82 (FIGS. 4 and 5) that need to be formatted to associate with a particular service category being scored such as reliability or performance. Analytics performance factors 82 such as geographic coverage or benchmarking data may be collected by various analytics processes such as technology surveys, or benchmarking measurements of read/write latency in a cloud storage device. In an embodiment, analytics result 54 may be combined with sentiment result 52 in order to stabilize and broaden the perspective of scoring system 10. Alternately, analytics data 24 may not be combined with sentiment results for providing a normalized score 78, and the decision to combine analytic result 54 may be dependent on the service category being scored.

Referring to FIG. 1 and FIGS. 4 through 13, in various embodiments, the results being combined for a particular service category may be weighted 64 according to a relative influence of each result. The results being combined may include at least one of classified sentiment result 52, structured sentiment result 56, and structured analytics result 54. In an embodiment depicted in FIG. 4, for example, a weighting 64 factor of 0.1 (10%) may be applied to each of five analytics performance factors 82 making up structured analytics result 54, whereas a weighting 64 factor of 0.4 (40%) may be applied to structured sentiment result 56 from the CloudVibe™ crowd-sourcing application. And, a weighting 64 factor of 0.1 (10%) may be applied to classified sentiment result 52 from Twitter™. 111 points may be chosen as the maximum weighted result 84 for any category and for normalized score 78. Alternately, any scale value may be used for the maximum normalized score 78. After weighting 64, all of the weighted results 84 may be combined into weighted sum 90 and normalized 66 to a standard scale, such as 1000.

Figure 6:
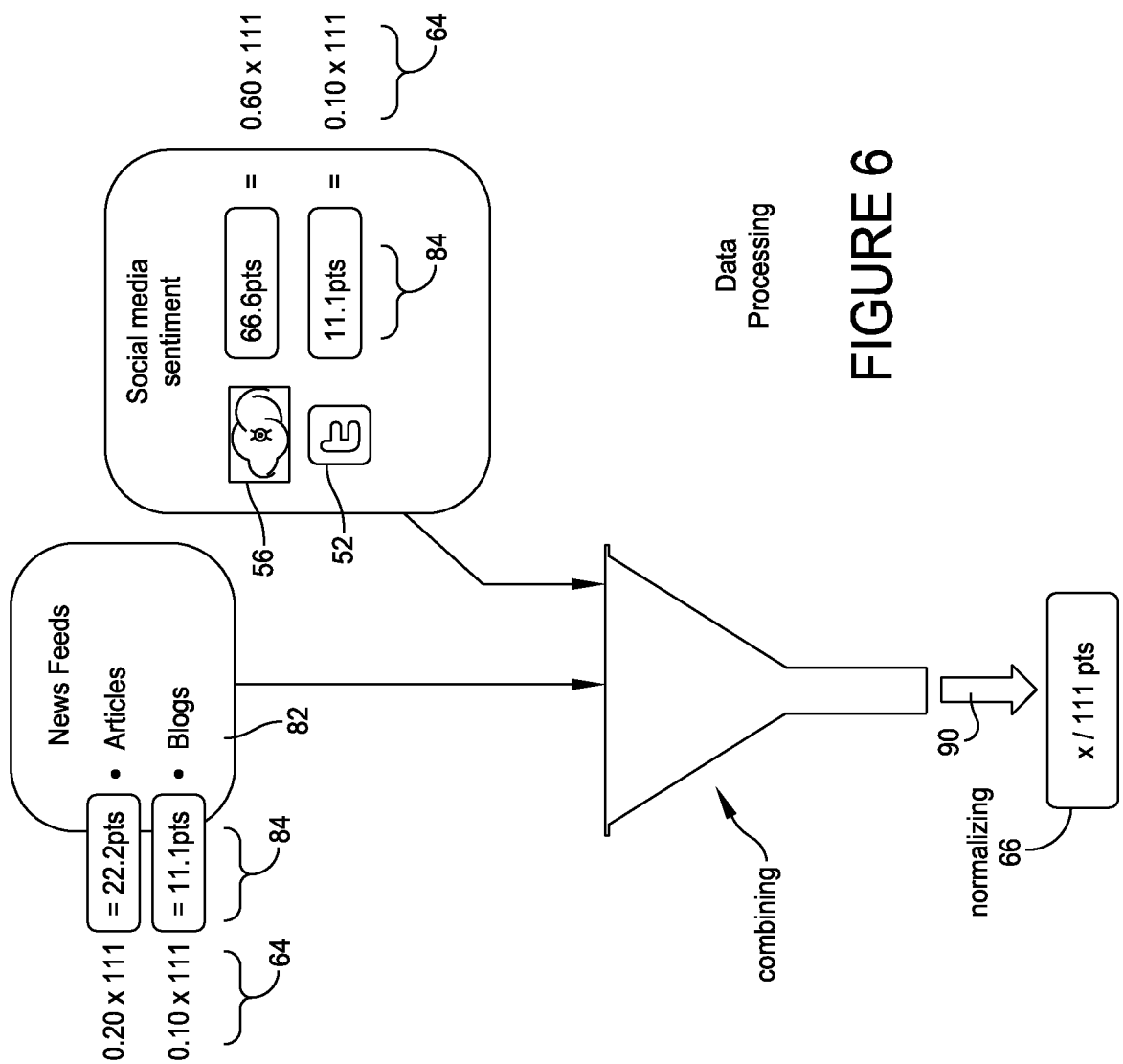
FIG. 6 illustrates a data processing calculation for a cloud computing scoring systems and methods, in accordance with an embodiment of the present disclosure.
Figure 7:
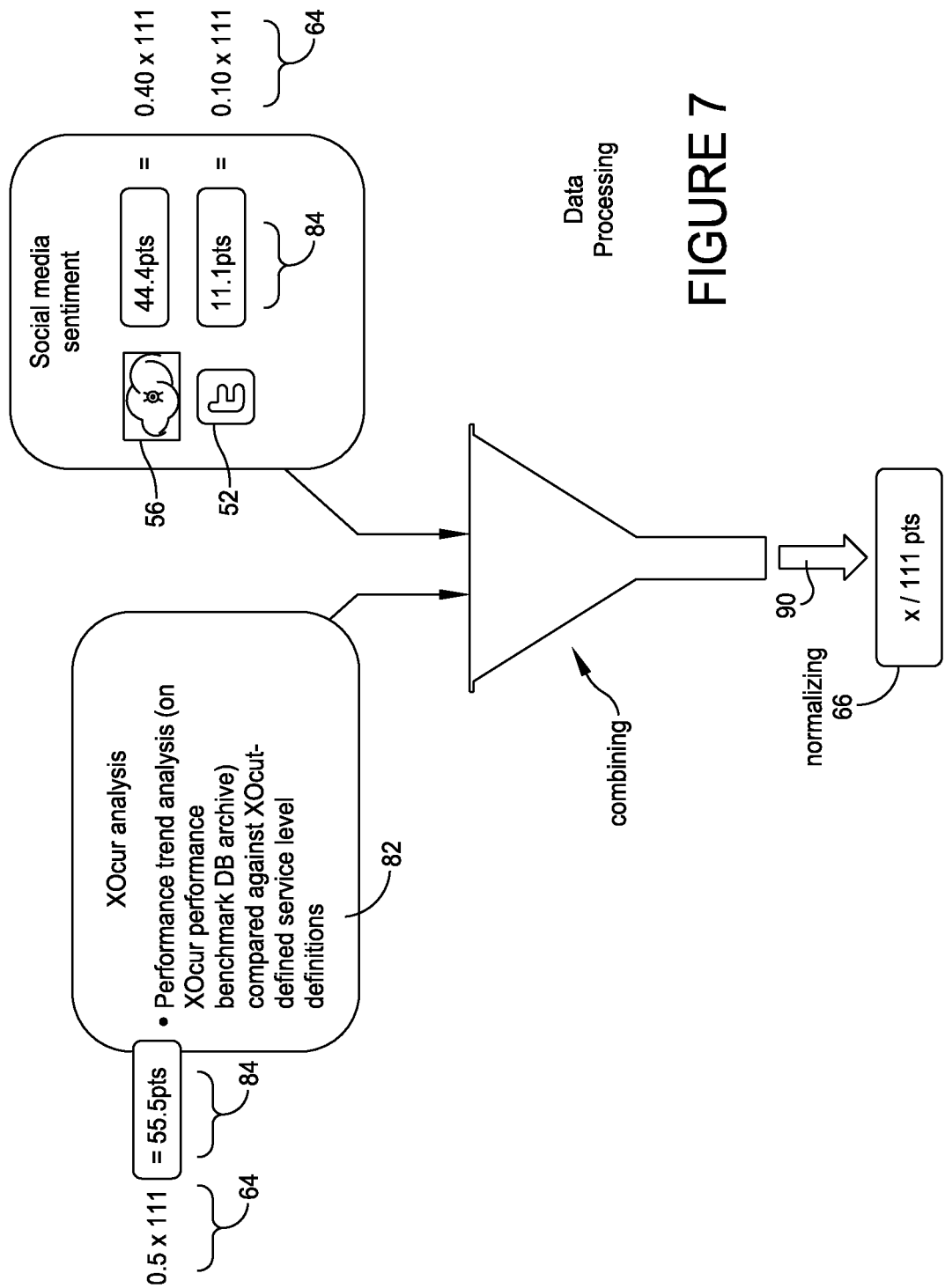
FIG. 7 illustrates a data processing calculation for a cloud computing scoring systems and methods, in accordance with an embodiment of the present disclosure.
Figure 8:
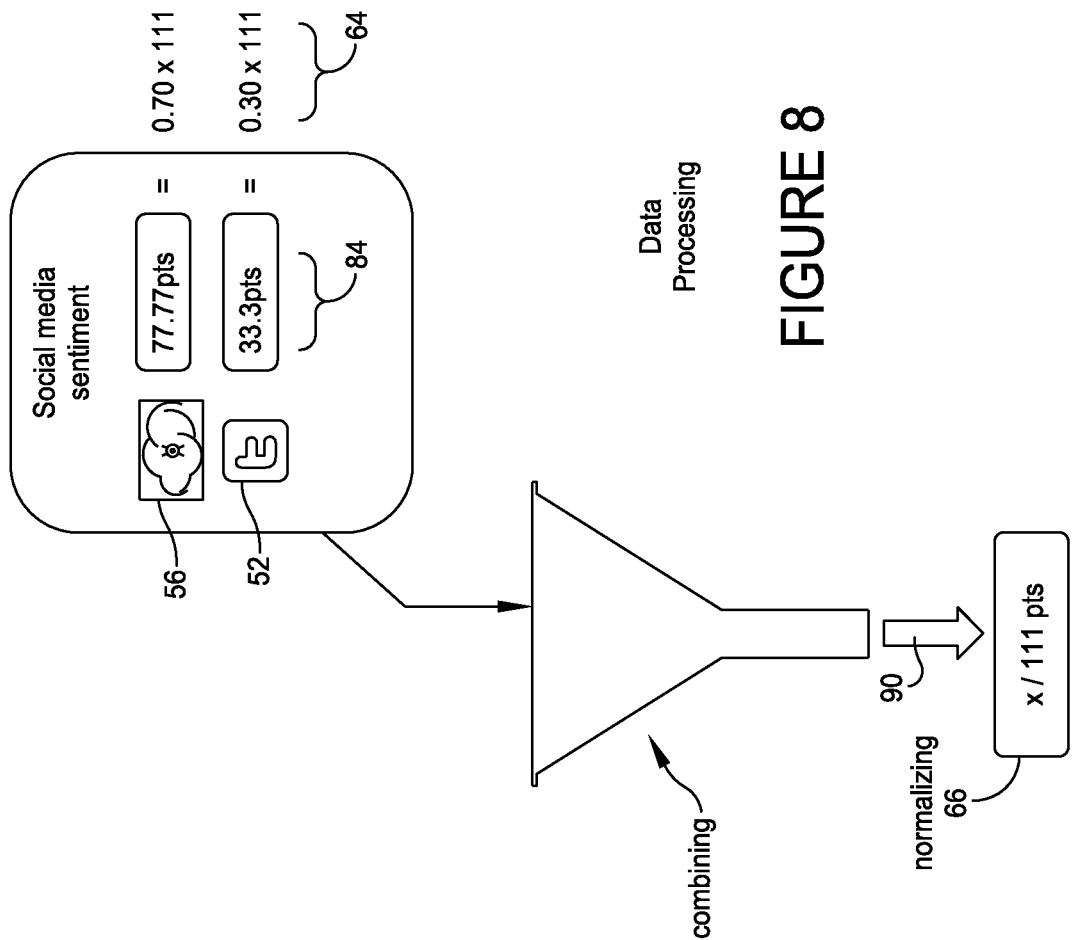
FIG. 8 illustrates a data processing calculation for a cloud computing scoring systems and methods, in accordance with an embodiment of the present disclosure.
Figure 9:
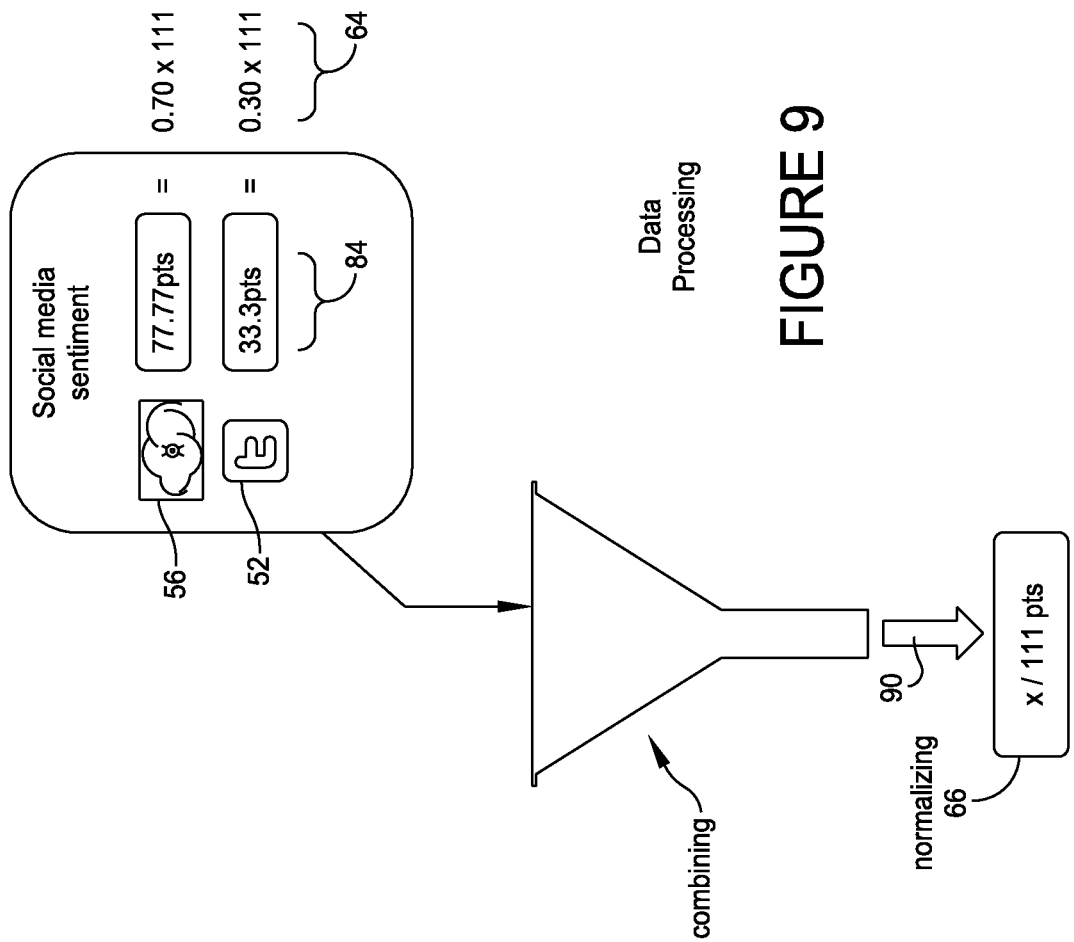
FIG. 9 illustrates a data processing calculation for a cloud computing scoring systems and methods, in accordance with an embodiment of the present disclosure.
Figure 10:
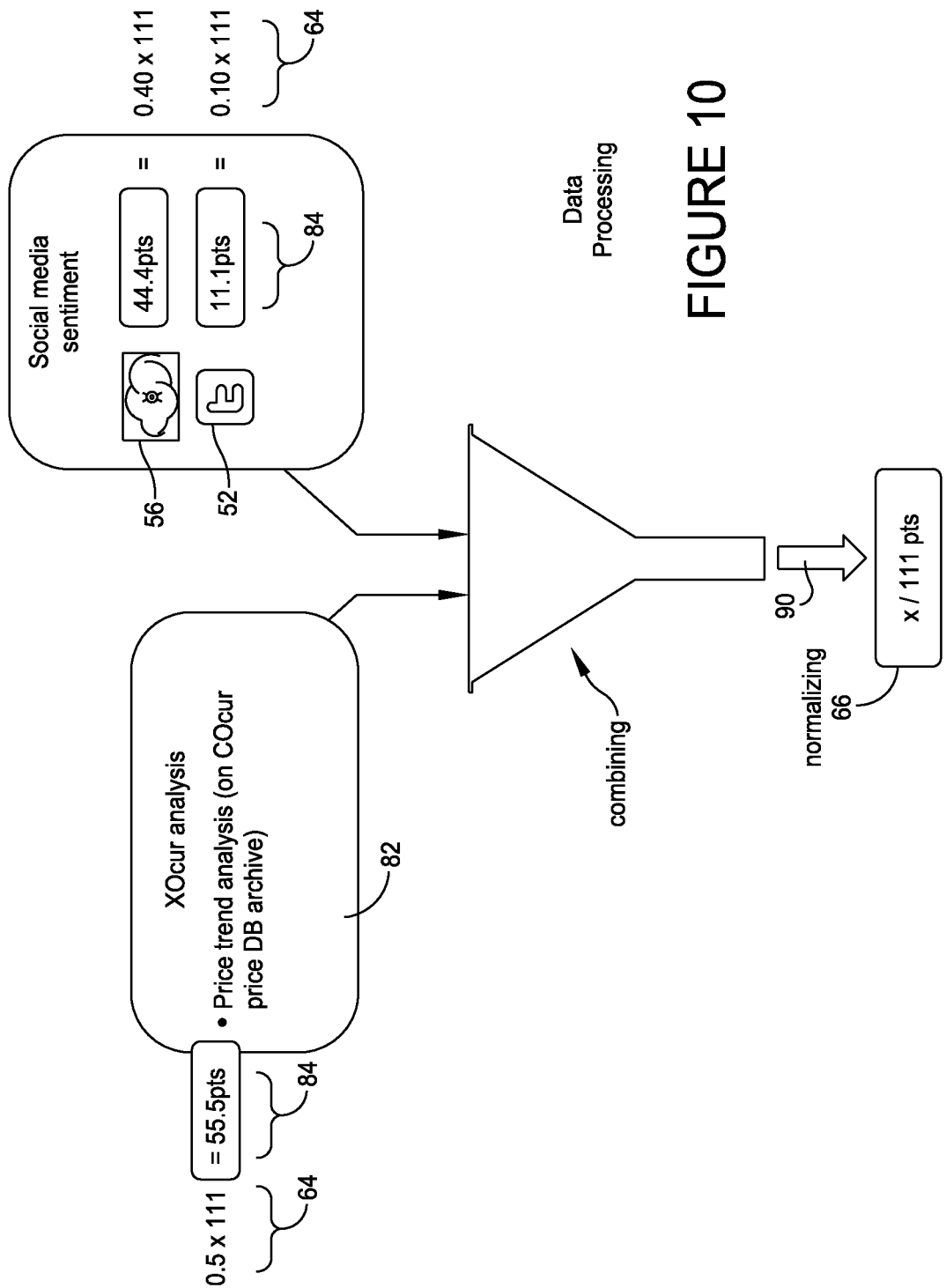
FIG. 10 illustrates a data processing calculation for a cloud computing scoring systems and methods, in accordance with an embodiment of the present disclosure.
Figure 11:
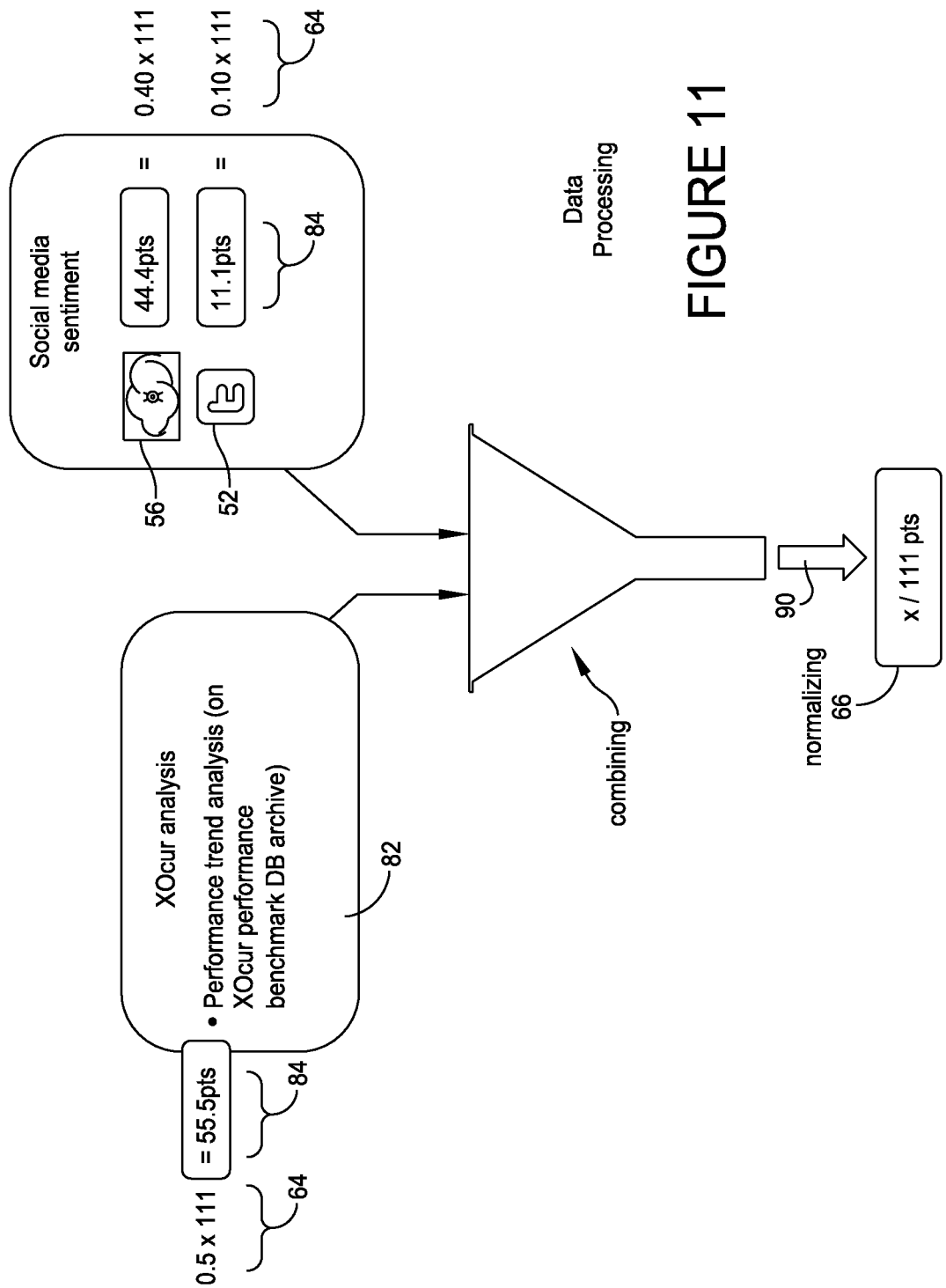
FIG. 11 illustrates a data processing calculation for a cloud computing scoring systems and methods, in accordance with an embodiment of the present disclosure.
Figure 12:
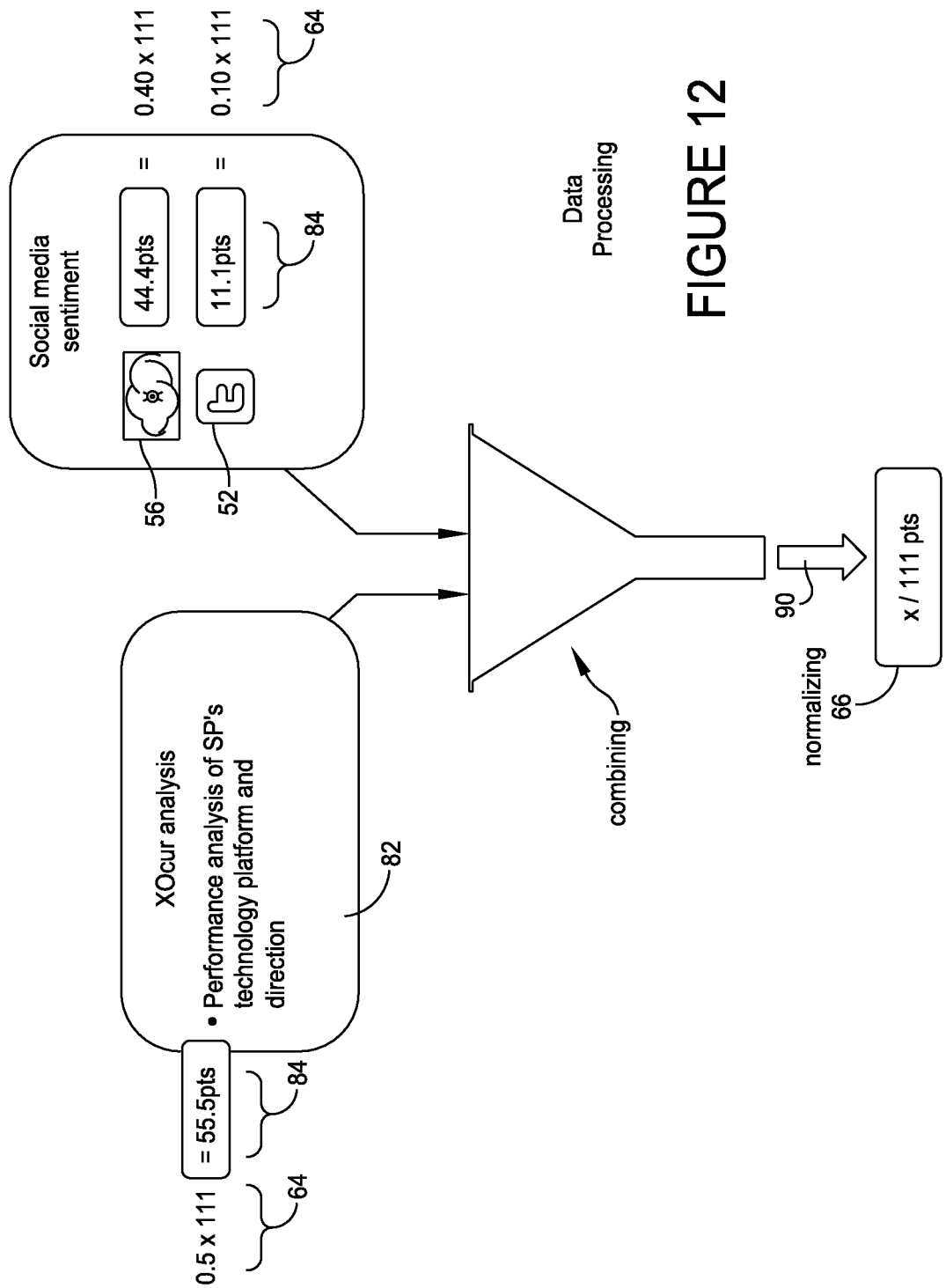
FIG. 12 illustrates a data processing calculation for a cloud computing scoring systems and methods, in accordance with an embodiment of the present disclosure.
Figure 15:
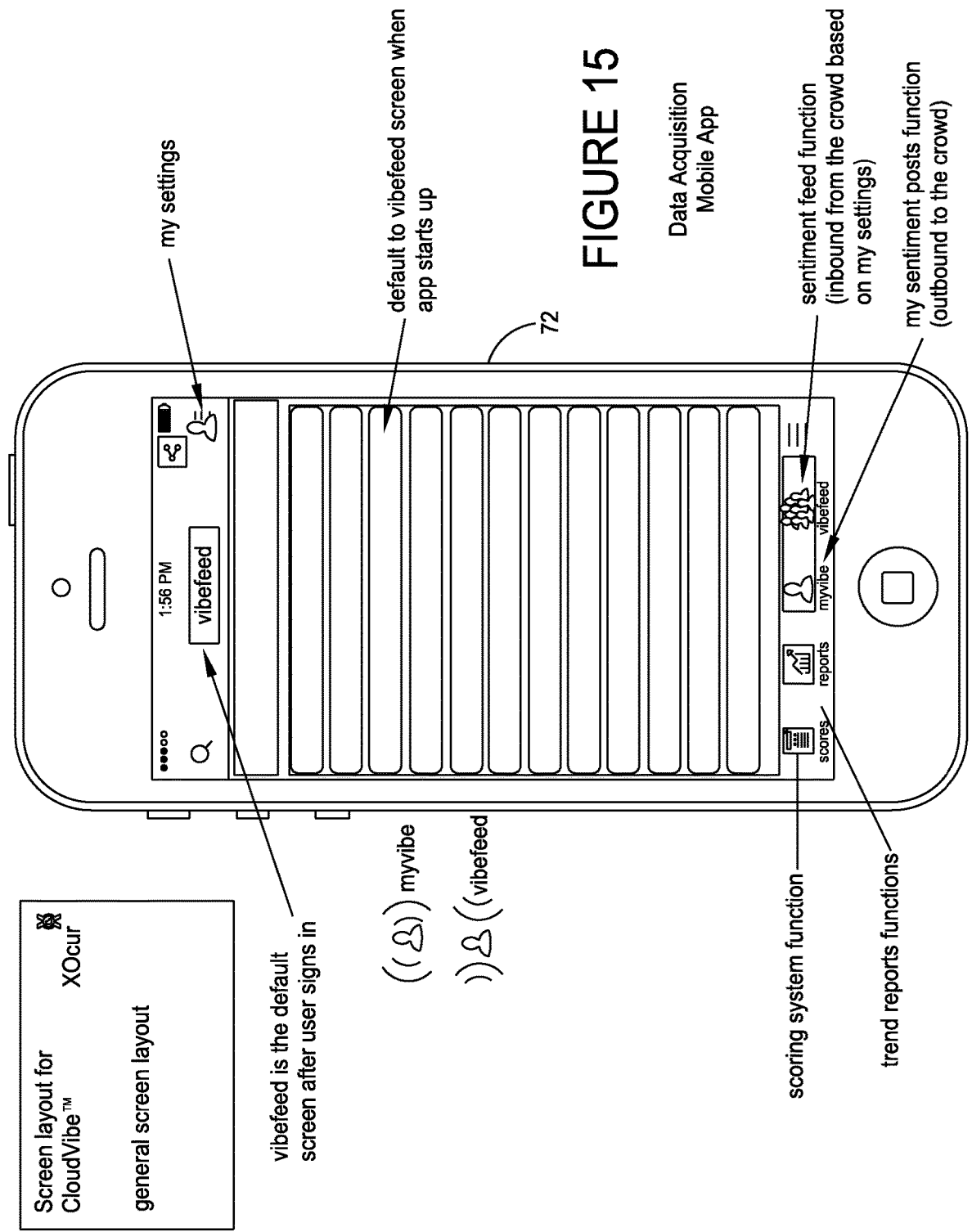
FIG. 15 illustrates a mobile application for data acquisition and display for a cloud computing scoring systems and methods, in accordance with an embodiment of the present disclosure.

Continuing with FIG. 1 and FIGS. 4 through 13, in various embodiments, classified sentiment result 52 may be combined with structured sentiment result 56, as shown in FIGS. 6, 8, and 9, to yield a normalized score 78 (FIG. 13). In other embodiments, structured analytics result 54 may be combined with both sentiment results 52 and 56, as shown in FIGS. 4, 5, 7, and 10-12, to yield a normalized score 78. In an embodiment not shown in FIGS. 4-12, structured analytics result 54 may be combined with one of sentiment result 52 and 56 to yield a normalized score 78. Normalization 66 may be set to a standard scale, such as 1000, for matching the scale of a user interface used to display 68 scores. Scores 78 may be displayed 68 on user interfaces such as the CloudSphere™ and CloudVibe™ products.

Figure 16:
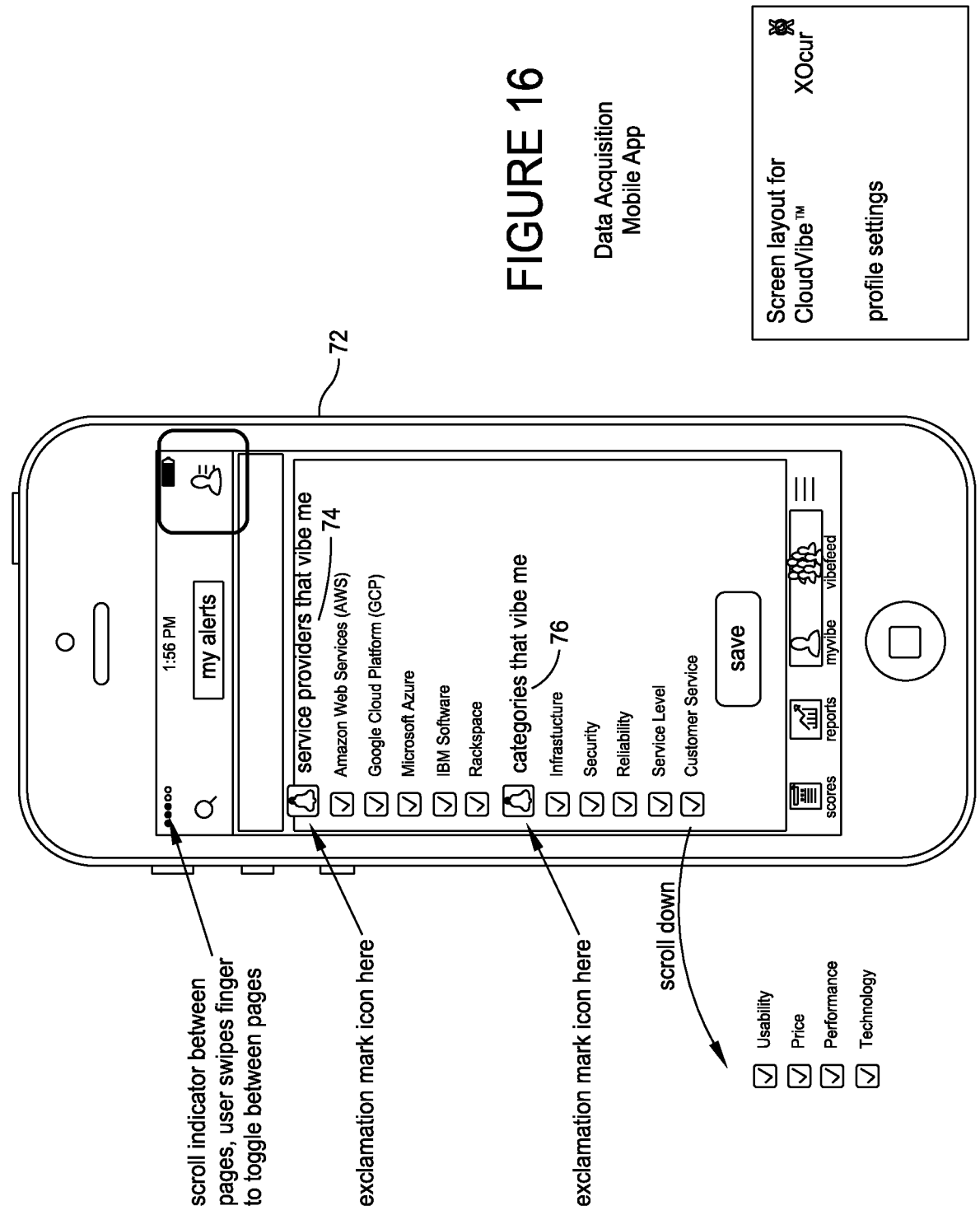
FIG. 16 illustrates a mobile application for data acquisition and display for a cloud computing scoring systems and methods, in accordance with an embodiment of the present disclosure.
Figure 17:
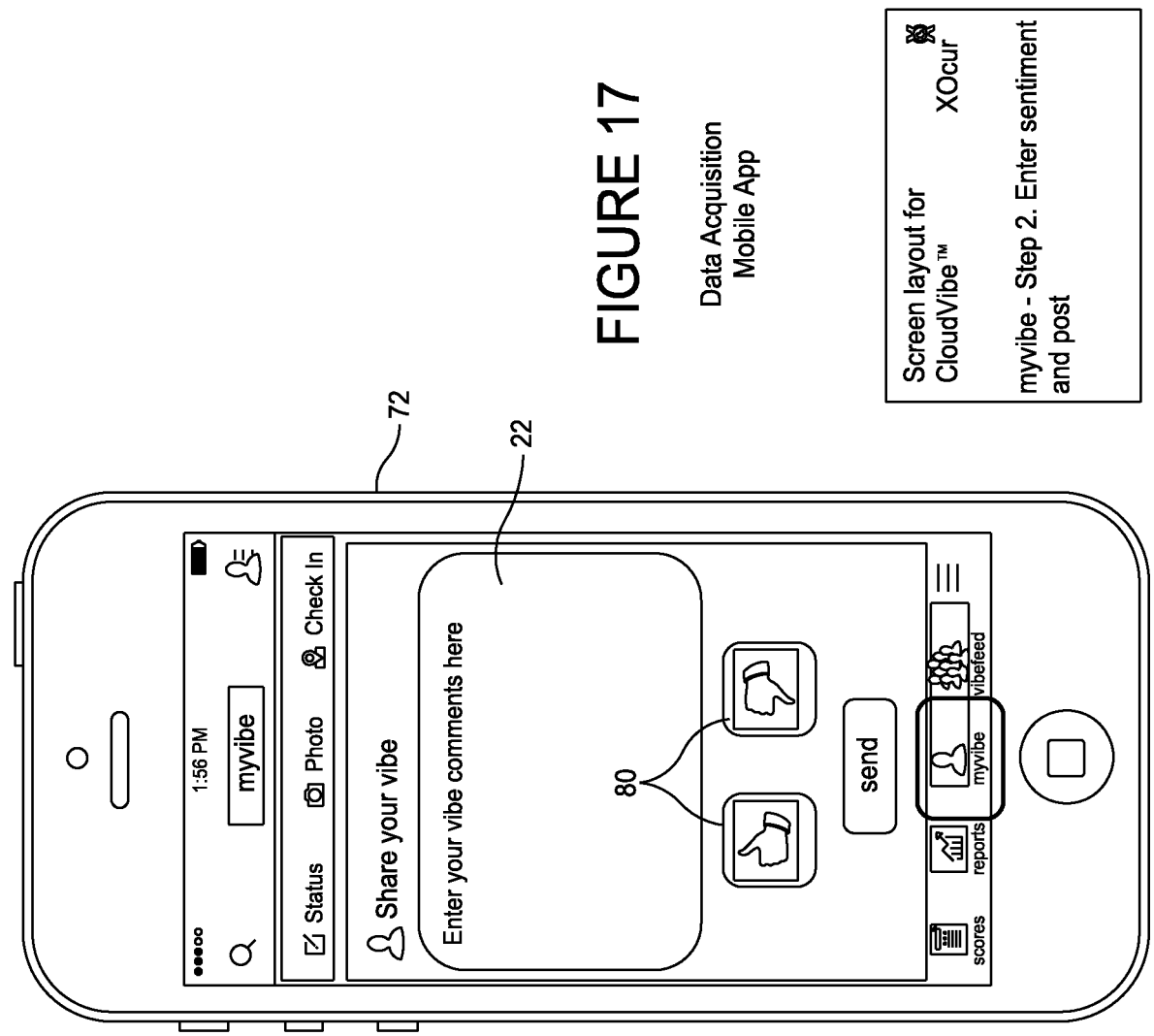
FIG. 17 illustrates a mobile application for data acquisition and display for a cloud computing scoring systems and methods, in accordance with an embodiment of the present disclosure.
Figure 18:
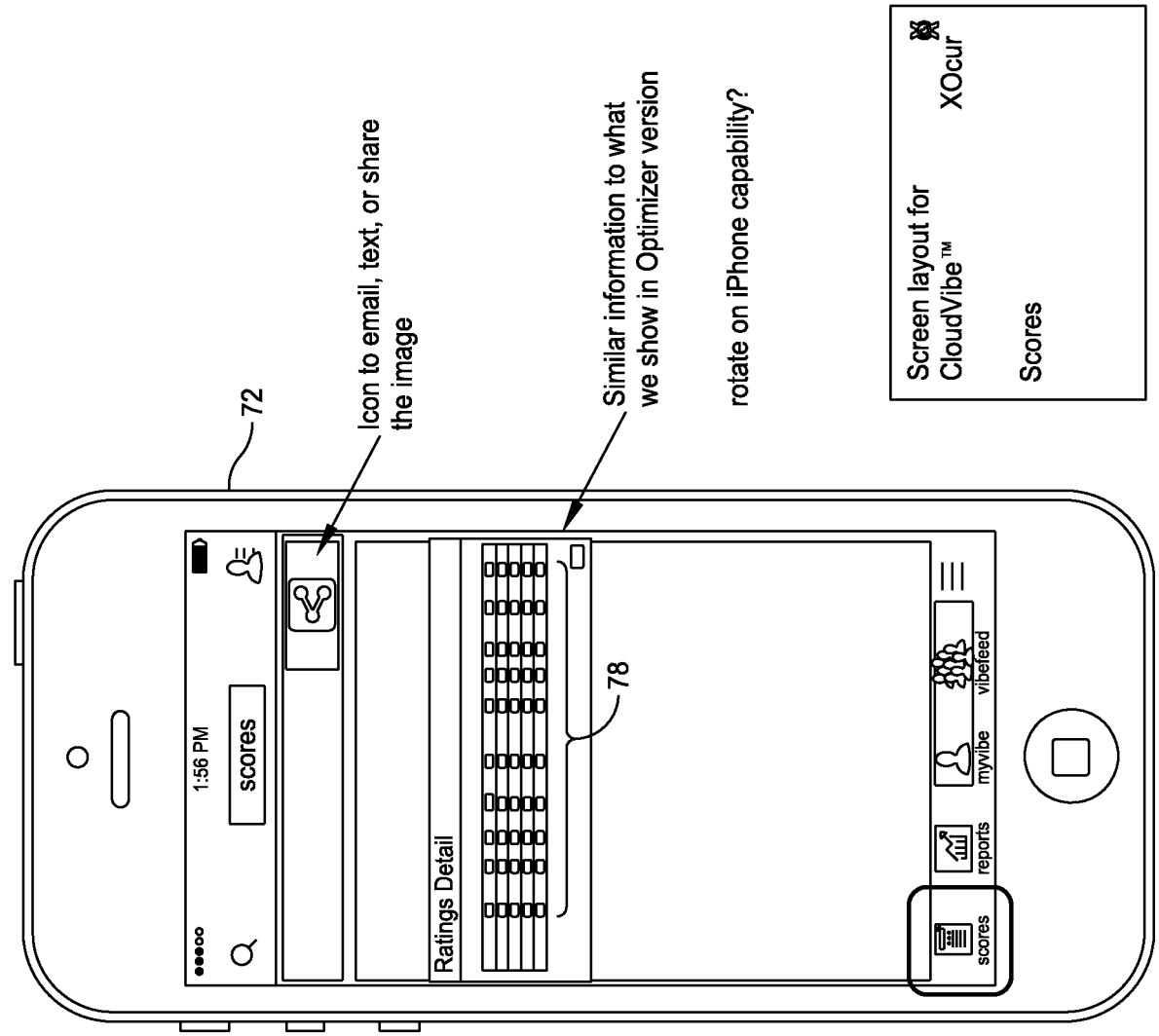
FIG. 18 illustrates a mobile application for data acquisition and display for a cloud computing scoring systems and methods, in accordance with an embodiment of the present disclosure.

Referring now to FIGS. 13 through 19, in various embodiments, a mobile phone having the CloudVibe™ mobile application 72 may display normalized scores 78 for each of five scored services 74 and according to service categories 76 on a standard scale of 1000 (FIGS. 13 and 16). Each normalized score 78 may be color coded according to a low (e.g. 114), medium (e.g. 422) or high (e.g. 790) score. Alternatively, scores 78 may be displayed on any user interface or by any communications means, such as displaying scores 78 on a web application, by a text message, by an email message, or through a paper report. FIG. 14 illustrates a log-in screen through which a user may access mobile application 72. Options may be presented to the user and may include posting sentiment 22 (FIG. 17), viewing scores 78 (FIG. 18), or viewing trend reports (FIG. 19). In an embodiment shown in FIG. 17, a user of mobile application 72 may be asked to classify a service category with a "thumbs up" or thumbs down" polarity classification 80 associated with brief sentiment data 22.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

Various embodiments of the present systems and methods may be used as a tool internally by a cloud consultant as input into a final report for a client.

Various embodiments of the present systems and methods may be integrated into upstream or downstream supply chain or provisioning systems in the form of OEM.

Various embodiments of the present systems and methods may be the foundation for a cloud marketplace resource trading or bidding system.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system comprising:
one or more processor(s); and
one or more computer-readable hardware storage device(s) having stored thereon computer-executable instructions that are executable by the one or more processor(s) to cause the computer system to implement a scoring system, which provides a graphical user interface (GUI) configured to display scoring data that is used to provide a comparative view of different computing services that are scored by the scoring system, by causing the computer system to:
receive unstructured sentiment data commenting on a scored service, wherein a parser identifies in the unstructured sentiment data a service category of the scored service, wherein the scored service is included in a plurality of services available for scoring, and wherein the service category is included in a plurality of service categories;
access a keyword dictionary, the parser selecting from the unstructured sentiment data text relating to the service category and matching one or more opinionative word(s) and phrase(s) listed in the keyword dictionary, thereby producing a structured comment associated with the service category;
access a learning seed file to classify the structured comment as positive or negative according to a list of exemplary sentiment data sets contained in the learning seed file, the exemplary sentiment data sets being assigned a positive or a negative polarity, wherein the learning seed file is configured to be enhanced by ongoing addition of structured sentiment data, the structured sentiment data commenting on the scored service and having a polarity classification;
generate a structured analytics result based on analytics data quantifying a performance of the scored service, wherein the quantified performance of the scored service includes a read/write latency performance of the scored service;
generate a normalized score for the scored service, wherein the normalized score is based at least on a combination of the structured comment, which is produced by accessing the keyword dictionary to match text in the unstructured sentiment data to the one or more opinionative words and phrases listed in the keyword dictionary, and the structured analytics result; and
cause the GUI to be displayed on a display, wherein the following elements are displayable within the GUI:
a first list displaying at least some services included in the plurality of services, wherein each service displayed in the first list is selectable such that, when one or more of the service(s) in the first list are selected, the selected one or more service(s) are to receive a corresponding score; and
a second list displaying at least some service categories included in the plurality of service categories, the second list being displayed simultaneously with and proximately to the first list, wherein each service category in the second list is selectable such that, when one or more of the service categories in the second list are selected, the selected one or more service(s) that are to be scored are scored in categories corresponding to the one or more selected service categories.

2. The computer system of claim 1, wherein:
the assigning of the positive or the negative polarity to the exemplary sentiment data sets is performed by an industry expert.

3. The computer system of claim 1, wherein:
the structured sentiment data is from a crowd-sourcing application for scoring the scored service.

4. The computer system of claim 1, wherein:
the unstructured sentiment data is from at least one of a mobile application, Twitter®, Facebook®, unstructured analytics data, and social networking feeds.

5. The computer system of claim 1, further comprising:
the learning seed file associating the polarity classification with opinionative words and phrases of the structured sentiment data for adding to the learning seed file if the learning seed file is enhanced thereby.

6. The computer system of claim 1, further comprising:
a classifier classifying the structured comment as positive or negative according to the exemplary sentiment data sets in the learning seed file, the classifier thereby generating a classified sentiment result;
a structured sentiment result comprising the service category and the polarity classification of the structured sentiment data; and
a data processing component weighting the classified sentiment result and the structured sentiment result according to a relative influence of each to generate weighted results, the weighted results being combined and normalized on a standard scale into the normalized score of the scored service.

7. The computer system of claim 6, further comprising:
an analytics scoring block receiving the analytics data quantifying the performance of the scored service, the analytics scoring block processing the analytics data to generate the structured analytics result in a format compatible with the classified sentiment result, wherein the data processing component produces the weighted results by weighting the following according to a relative influence of each: the classified sentiment result, the structured sentiment result, and the structured analytics result.

8. The computer system of claim 1, further comprising:
a classifier classifying the structured comment as positive or negative according the exemplary sentiment data sets in the learning seed file, the classifier thereby generating a classified sentiment result;
an analytics scoring block receiving the analytics data quantifying the performance of the scored service, the analytics scoring block processing the analytics data to generate the structured analytics result in a format compatible with the classified sentiment result; and
a data processing component weighting the classified sentiment result and the structured analytics result according to a relative influence of each, the weighted results being combined and normalized on a standard scale into the normalized score of the scored service.

9. A computer system comprising:
one or more processor(s); and
one or more computer-readable hardware storage device(s) having stored thereon computer-executable instructions that are executable by the one or more processor(s) to cause the computer system to implement a scoring system, which provides a graphical user interface (GUI) configured to display scoring data that is used to provide a comparative view of different computing services that are scored by the scoring system, by causing the computer system to:
- gather data reporting on a scored service in a service category, the data gathered from at least two of unstructured sentiment data, structured sentiment data, and structured analytics data, wherein the scored service is included in a plurality of services available for scoring, and wherein the service category is included in a plurality of service categories;
- perform sentiment analysis on the sentiment data to generate a classified sentiment result from the unstructured sentiment data and a structured sentiment result from the structured sentiment data;
- generate a structured analytics result based on analytics data quantifying a performance of the scored service, wherein the quantified performance of the scored service includes a read/write latency performance of the scored service;
- weight the structured analytics result, the classified sentiment result, and the structured sentiment result according to a relative influence of each;
- generate a normalized score for the scored service on a standard scale, wherein the normalized score is based at least on a combination of a structured comment, which is produced by accessing a keyword dictionary to match text in the unstructured sentiment data to one or more opinionative words and phrases listed in the keyword dictionary, and the structured analytics result, and wherein combining the weighted results operates to stabilize a perspective of the scoring system; and
- display the normalized score for the scored service within the service category using the GUI, where the following additional elements are displayable within the GUI:
  - a first list displaying at least some services included in the plurality of services, wherein each service displayed in the first list is selectable such that, when one or more of the service(s) in the first list are selected, the selected one or more service(s) are to receive a corresponding score; and
  - a second list displaying at least some service categories included in the plurality of service categories, the second list being displayed simultaneously with and proximately to the first list, wherein each service category in the second list is selectable such that, when one or more of the service categories in the second list are selected, the selected one or more service(s) that are to be scored are scored in categories corresponding to the one or more selected service categories.

10. The computer system of claim 9, further comprising:
a learning seed file for classifying the unstructured sentiment data as positive or negative according to a list of exemplary sentiment data sets contained in the learning seed file, the exemplary sentiment data sets being assigned a positive or a negative polarity, the learning seed file thereby generating the classified sentiment result; and
wherein the learning seed file is configured to be enhanced by ongoing addition of the structured sentiment data, the structured sentiment data commenting on the scored service and having a polarity classification.

11. The computer system of claim 10, wherein:
the assigning of the positive or the negative polarity to the exemplary sentiment data sets is performed by an industry expert.

12. The computer system of claim 9, wherein:
the structured sentiment data is from a crowd-sourcing application for scoring the scored service.

13. The computer system of claim 9, wherein:
the unstructured sentiment data is from at least one of a mobile application, Twitter®, Facebook®, unstructured analytics data, and social networking feeds.

14. A computer-implemented cloud computing scoring method for implementing a scoring system that provides a graphical user interface (GUI) configured to display scoring data that is used to provide a comparative view of different computing services, the method comprising:
- parsing unstructured sentiment data commenting on a scored service, the parsing identifying a service category of the scored service, wherein the scored service is included in a plurality of services available for scoring, and wherein the service category is included in a plurality of service categories;
- selecting from the unstructured sentiment data text that matches one or more opinionative words and phrases listed in a keyword dictionary, thereby producing a structured comment associated with the service category;
- classifying, using a learning seed file, the structured comment as positive or negative according to a list of exemplary sentiment data sets contained in the learning seed file, the exemplary sentiment data sets being assigned a positive or a negative polarity, said classifying thereby generating a classified sentiment result;
- configuring the learning seed file to be enhanced by ongoing addition of structured sentiment data, the structured sentiment data commenting on the scored service and having a polarity classification;
- generating a structured analytics result based on analytics data quantifying a performance of the scored service, wherein the quantified performance of the scored service includes a read/write latency performance of the scored service;
- generating a normalized score for the scored service, wherein the normalized score is based at least on a combination of the structured comment, which is produced by accessing the keyword dictionary to match text in the unstructured sentiment data to the one or more opinionative words and phrases listed in the keyword dictionary, and the structured analytics result; and
- causing the GUI to be displayed on a display, wherein the following elements are displayable within the GUI:
  - a first list displaying at least some services included in the plurality of services, wherein each service displayed in the first list is selectable such that, when one or more of the service(s) in the first list are selected, the selected one or more service(s) are to receive a corresponding score; and
  - a second list displaying at least some service categories included in the plurality of service categories, the second list being displayed simultaneously with and proximately to the first list, wherein each service category in the second list is selectable such that, when one or more of the service categories in the second list are selected, the selected one or more service(s) that are to be scored are scored in categories corresponding to the one or more selected service categories.

15. The method of claim 14, wherein:
the assigning of the positive or the negative polarity to the exemplary sentiment data sets is performed by an industry expert.

16. The method of claim 14, wherein:
the structured sentiment data is from a crowd-sourcing application for scoring the scored service.

17. The method of claim 14, wherein:
the unstructured sentiment data is from at least one of a mobile application, Twitter®, Facebook®, unstructured analytics data, and social networking feeds.

18. The method of claim 14, further comprising:
associating, using the learning seed file, the polarity classification with opinionative words and phrases of the structured sentiment data for adding to the learning seed file if the learning seed file is enhanced thereby.

19. The method of claim 14, further comprising:
generating a structured sentiment result comprising the service category and the polarity classification of the structured sentiment data;
weighting the classified sentiment result and the structured sentiment result according to a relative influence of each;
combining said weighted sentiment results; and
normalizing, on a standard scale, said combined weighted sentiment result into the normalized score of the scored service.

20. The method of claim 19, further comprising:
receiving the analytics data quantifying the scored service; and
processing the analytics data to generate the structured analytics result, which is formatted in a format compatible with the sentiment results;
wherein the following results are weighted according to a relative influence of each:
the classified sentiment result,
the structured sentiment result, and
the structured analytics result.

* * * * *